Nov. 30, 1926.  
W. H. McFADDEN  
1,609,274  
BUMPER CARRIED CHAIN BOX  
Filed August 3, 1926
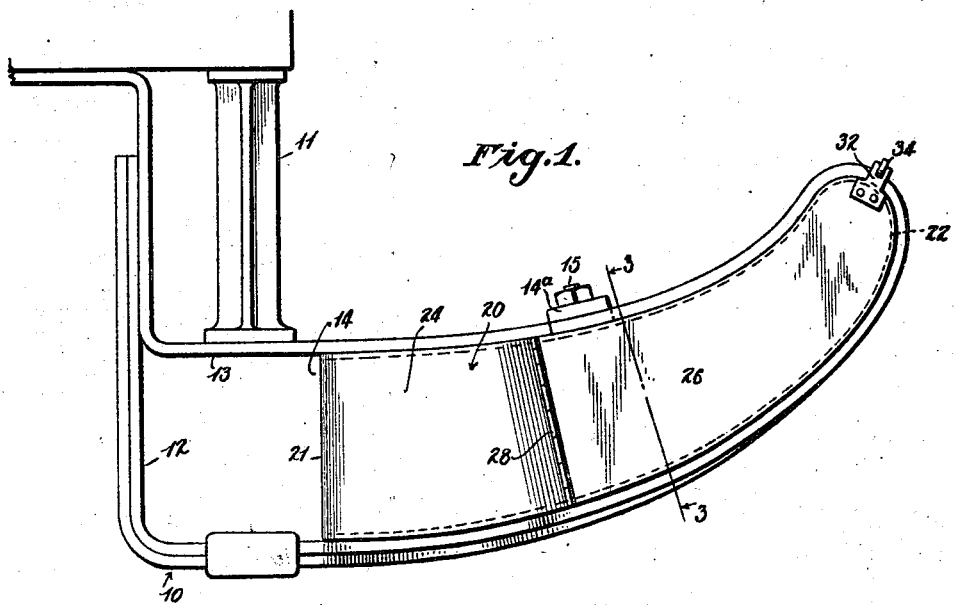
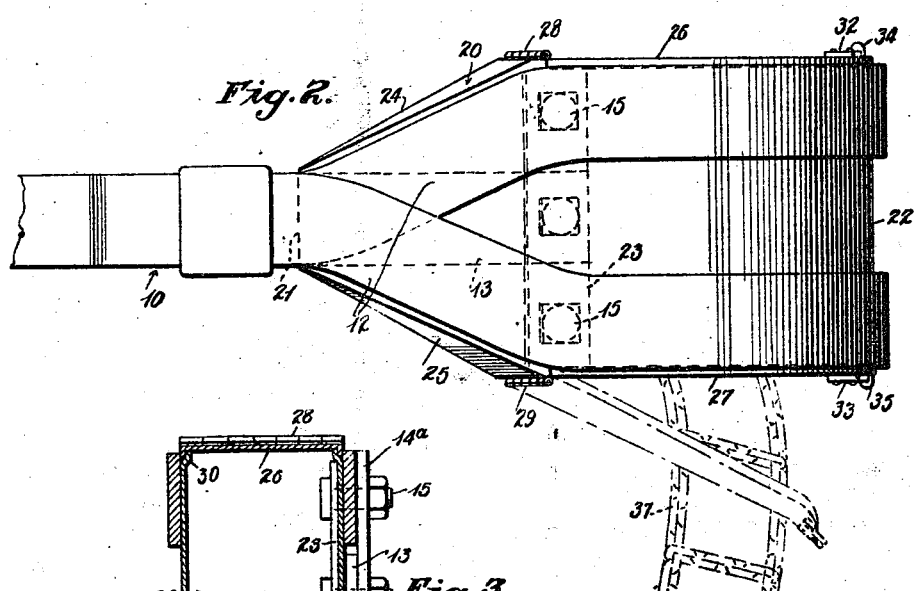
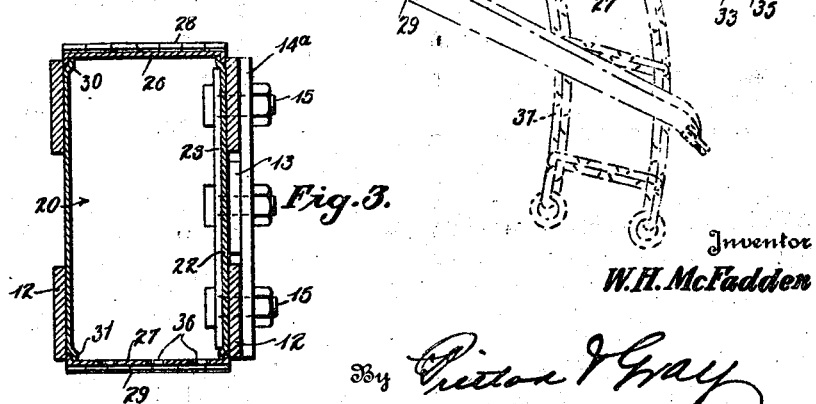
Inventor  
W.H.McFadden Patented Nov. 30, 1926.

1,609,274

UNITED STATES PATENT OFFICE.

WILLIAM H. McFADDEN, OF PONCA CITY, OKLAHOMA, ASSIGNOR TO MARLAND REFINING COMPANY, OF PONCA CITY, OKLAHOMA.

BUMPER-CARRIED CHAIN BOX.

Application filed August 3, 1926. Serial No. 126,807.

This invention relates to an attachment for an automobile bumper, and consists of a novel box or receptacle coacting therewith, and adapted to store tools or accessories, and particularly anti-skid chains, when the latter are not being used.

A prime object is to provide, in combination with a generally looped bumper, a box or receptacle adapted to substantially fit the space within the loop and intimately engage and be fastened to the bars thereof, so that such bars and box will be mutually braced and protected.

Another important aim is to produce the box or receptacle with a downwardly displaceable bottom, so that the chains or the like may fall from the box directly onto the ground when desired to minimize the handling, and particularly the lifting thereof incidental to attachment to the wheels, since the chains invariably collect and retain dirt and must usually be applied while the driver is well dressed and caught unawares.

The invention further provides the box with a fixed inclined bottom portion which assists in the discharge of the chain when the bottom closure is opened; the lid and bottom close with locks, and the bottom with perforations for drainage of water and escape of dirt from the chains and box.

Additional objects and advantages will become apparent from a consideration of the description following, taken in connection with the accompanying drawings illustrating an operative embodiment. In said drawings, Fig. 1 is a plan view of a fender guard, or section of a bumper having my improvements applied thereto;

Fig. 2 is a rear elevation of the parts of Fig. 1 with the discharging of a chain suggested by dotted lines, and Fig. 3 is a sectional view taken on the line 3—3 of Fig. 1.

Referring specifically to the drawing, a bumper as used on automobiles or other vehicles is shown at 10. Said illustration specifically is one-half of a rear bumper and better known at present in the trade as a fender guard. In practice therefore there are two of these fender guards accommodating a spare tire between them and being connected together in front thereof (not shown) and to the auto chassis or vehicle as by brackets 11. This bumper or fender guard is to be taken as conventional of that type wherein the bars 12 and 13 from which it is fabricated form a loop or enclose a space, 14, of considerable area, open at the top and bottom. At the front, or portion of the bumper nearest the vehicle chassis, a vertical bar or cleat 14$^a$ is disposed to which the terminals of the bars 12 and 13 are fastened detachably, as by means of bolts 15.

In carrying out my improvements, a box or receptacle 20 removably occupies the space 14. Said receptacle is preferably metallic, and has a flat up-standing end wall 21 and a curved up-standing wall 22 providing merging sides and the other end. The wall 22 throughout intimately engages the bars 12 and 13, and the bolts 15 are passed through said wall 22 to secure the box and receptacle in place. The particular shape of the box and engagement thereof with the bumper co-act with the single row of bolts 15 in mounting the box in an unusually secure manner.

For purposes of reinforcement a metallic strip or cleat 23 may be arranged within the box in contact with wall 22, and through which the bolts 15 initially pass. As shown, bolts 15 have relatively small heads so as to avoid undue obstruction of the box space. In cases where the specific form of the bumper differs from that shown, other means of fastening of the box may be resorted to.

At the top and bottom the box or receptacle is also shaped to conform to the figure produced by the rear portions of the bars 12 and 13 and to this end have top and bottom walls 24 and 25 rigid with walls 21 and 22 and diverging from the former, and to the outer ends of which closures 26 and 27, respectively, are transversely hinged at 28 and 29.

The wall 22 forwardly of the hinges 28 and 29 is provided with shallow flanges 30 and 31 and said flanges as well as the adjacent portions of the wall 22 are preferably crimped as shown or otherwise reinforced.

Each closure 26 and 27 has a hasp, as at 32 and 33 respectively, fastened to the outer end thereof and is engaged by suitable locks 34 and 35 respectively, preferably under control of the same key. Said locks are secured to the bars 12 as shown, or to wall 22 in any suitable manner against successful tampering.

The wall 25 and bottom closure 27 are preferably perforated to produce drain or discharge openings at 36.

It is to be understood that both fender guards of the type shown which make up the complete bumper, may be equipped with the improvements if desired.

Presuming the bumper or fender guard 10 to be equipped with the box or receptacle 20, the desired tools, accessories or the like are placed within the box from above while lid 26 is open, and they are locked therein by the devices 32 and 34. Said box 20 is particularly used to accommodate and carry the anti-skid chains 37, so that the latter will never be in such relation to the automobile that water or dirt can fall therefrom onto the sides, floor or adjacent structure.

Water and loose dirt may escape from the box through perforations 36. Bottom closure 27 is held closed by the lock 33 and when the chains are needed, the latter lock is key-operated to open it and thereby release the closure 27, so that because of the elevation of the bumper above the ground, the closure 27 swings downwardly by gravity and the weight of the chain 37, the automatic discharge of the chain being aided by the inclination of wall 25. The latter feature is suggested in dotted lines in Fig. 2. Said chains are accordingly released adjacent the walls or zone of their use without handling or danger of their wiping against the driver's clothing. Thereafter closure 27 is elevated and the device 33 is locked, hence when the chains are returned to the box, closure 27 in combination with wall 25 will support them.

Minor changes may be resorted to provided they fall within the spirit and scope of the invention.

I claim:

1. A receptacle to be carried by a bumper, the receptacle having a discharge opening, and a downwardly displaceable closure for said opening.

2. In combination with a bumper, a receptacle carried thereby provided with a discharge opening, a downwardly displaceable closure for said opening, the bumper serving to elevate the receptacle so that there will be clearance for the downward movement of said closure.

3. A receptacle to be carried by a bumper, the receptacle having a discharge opening, a downwardly displaceable closure for said opening, and said receptacle having an inclined bottom leading downwardly to said opening.

4. A receptacle to be carried by a bumper, the receptacle having a discharge opening, a downwardly displaceable closure for said opening, and means to lock said closure in closed position so that it may aid in supporting the contents of the receptacle.

5. In combination with a bumper formed with a loop and fastening means for the parts thereof, a receptacle within the loop having opposed wall portions conforming in shape thereto and in intimate contact therewith, and said fastening means engaging one of said wall portions to secure the receptacle in place.

6. A combination bumper and receptacle structure comprising a bumper loop, a receptacle laterally enclosed by the loop, fastening means securing the parts of the loop together and the receptacle thereto, a lid for the receptacle, a bottom closure for the receptacle, and locking devices for said lid and closure carried by the loop.

7. A receptacle adapted to be enclosed by a bumper, said receptacle having an upstanding wall provided with opposed curved portions conforming in shape and adapted to intimately fit adjacent portions of the bumper, a lid for the receptacle, said receptacle having a discharge opening through its bottom, a downwardly inclined bottom wall leading to said opening, and a closure hinged to the latter wall, a lock to secure the closure in position to aid in supporting the contents of the receptacle, said closure being adapted to swing downwardly under the weight of the said contents when the closure is unlocked.

WILLIAM H. McFADDEN.